(12) United States Patent
Koyama et al.

(10) Patent No.: US 6,421,572 B1
(45) Date of Patent: Jul. 16, 2002

(54) PROGRAMMABLE CONTROLLER FOR SEQUENTIALLY CONTROLLING CONTROLLED MACHINE

(75) Inventors: Katsunari Koyama; Mamoru Iida, both of Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/352,840

(22) Filed: Jul. 13, 1999

(30) Foreign Application Priority Data

Jan. 26, 1999 (JP) .......................................... 11-017136

(51) Int. Cl.[7] .............................................. G05B 15/00
(52) U.S. Cl. ............................. 700/83; 700/17; 710/55
(58) Field of Search .............................. 700/17–19, 21, 700/23, 75, 87, 11, 78, 80, 84; 710/55; 361/269

(56) References Cited

U.S. PATENT DOCUMENTS

| | | | | |
|---|---|---|---|---|
| 4,279,012 A | * | 7/1981 | Beckedorff et al. | ........... 700/16 |
| 5,128,857 A | * | 7/1992 | Okada et al. | ................... 700/21 |
| 5,369,740 A | * | 11/1994 | Naylor | .......................... 700/17 |
| 5,471,380 A | * | 11/1995 | Itami et al. | ..................... 700/17 |
| 5,537,605 A | * | 7/1996 | Teece | .............................. 712/1 |
| 5,555,172 A | * | 9/1996 | Potter | .......................... 455/456 |
| 6,141,628 A | * | 10/2000 | Worth et al. | ................. 702/185 |
| 6,212,439 B1 | * | 4/2001 | Cha | .............................. 700/83 |
| 6,259,955 B1 | * | 7/2001 | Brundisini et al. | ........... 700/15 |

* cited by examiner

*Primary Examiner*—Thomas Black
*Assistant Examiner*—Crystal J Barnes
(74) *Attorney, Agent, or Firm*—Morgan, Lewis & Bockius LLP (57) ABSTRACT

To provide a programmable controller for enabling a device value to be set and changed, and also referenced, easily and accurately. A programmable controller has a main unit CPU, a storage section, a display CPU, a display section, and a key section. The state of the key section is stored in a key information buffer of the display CPU. A control section of the display CPU sets and changes the device value stored in the storage section through the main unit CPU and causes the display section to display the device value stored in the storage section based on key information in the key information buffer.

14 Claims, 9 Drawing Sheets

PROGRAMMABLE CONTROLLER FOR SEQUENTIALLY CONTROLLING CONTROLLED MACHINE

BACKGROUND OF THE INVENTION

1. Field of the Invention

This invention relates to a programmable controller for performing sequential control of controlled machines.

2. Description of the Related Art

A programmable controller is used for sequentially controlling controlled machines. Input machines (e.g., switches and sensors) and output machines (e.g., electromagnetic switches, relays, solenoids and motors) are connected to the programmable controller.

A user program for sequentially controlling the controlled machines and various pieces of data including device information are stored in a storage section of the programmable controller.

The device information is information indicating the input state from an input machine, the output state to an output machine, and the state of an internal relay (auxiliary relay), a timer, a counter, data memory, etc., set in a user program. The device is a name referring to a memory area provided for storing the device information. Particularly, the internal relay, the timer, the counter, the data memory, and the like are called internal devices.

The user program of such a programmable controller is prepared using an external unit such as a dedicated programming unit and is transferred to the programmable controller. Such an external unit of a dedicated programming unit, etc., can also be used to monitor the device information (device value) of the programmable controller.

On the other hand, the programmable controller is provided with an analog trimmer for changing the values of the internal devices of the internal relay, the timer, the counter, the data memory, etc., without changing the user program.

Figure 11:
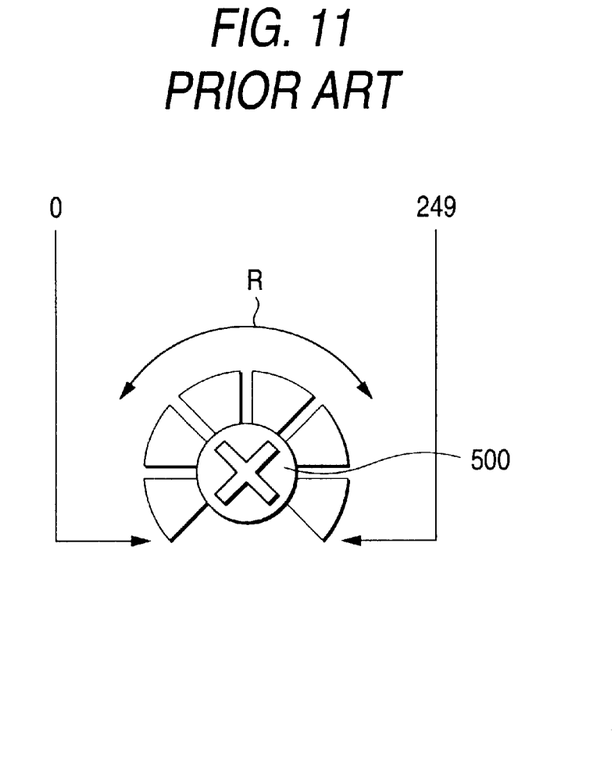
FIG. 11 is a drawing showing an analog trimmer in a related art.
Figure 12:
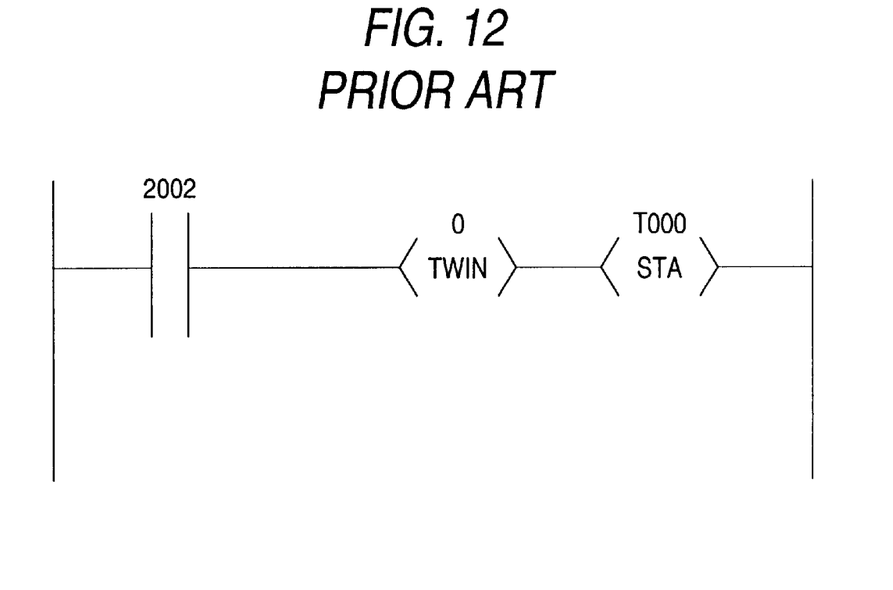
FIG. 12 is a ladder diagram showing an example of a user program for defining input of numeric data from the analog trimmer and setting of the value of the numeric data in an internal device.

For example, as shown in FIG. 11, an analog trimmer 500 as a knob is turned in the arrow R direction, whereby numeric data 0–249 responsive to the turn angle of the knob can be entered. As shown in FIG. 12, the value of the numeric data entered through the analog trimmer 500 can be set in the specified internal device on the user program.

In FIG. 12, TWIN is an instruction for transferring the numeric data corresponding to the turn angle of the analog trimmer 500 to an internal register. STA is an instruction for transferring the value of the internal register to the specified internal device such as the internal relay, the timer, the counter, or the data memory.

The example in FIG. 12 indicates transfer of the numeric data corresponding to the turn angle of the analog trimmer of trimmer number 0 to the internal register and transfer of the value of the internal register to timer T000 as a setup value. Thus, the setup value of the timer T000 can be changed by turning the analog trimmer 500 without changing the user program contents.

However, to use the analog trimmer 500 of the related programmable controller, there is a possibility that a shock to the programmable controller or careless touching of the analog trimmer 500 will shift the turn angle of the analog trimmer 500, changing the entered numeric data value.

If the analog trimmer 500 is placed in the depth of the cabinet of the programmable controller, a tool such as a screwdriver becomes necessary. Further, with the analog trimmer 500, it is difficult to accurately keep track of the current value entered. The resolution of the analog trimmer 500 is unique to the trimmer and cannot be changed.

On the other hand, to change or reference the device value of the programmable controller, an external unit such as a dedicated programming unit becomes necessary. Thus, the device value cannot be easily referenced or changed.

SUMMARY OF THE INVENTION

It is an object of the invention to provide a programmable controller for enabling a device value to be set, changed and referenced both easily and accurately.

According to one aspect of the invention, there is provided a programmable controller for sequentially controlling a controlled machine in accordance with a program, the programmable controller comprising storage means having a storage area defined as a device, a key for entering data, setting and changing means for setting a device value in the storage area of the storage means or changing the device value set in the storage area based on the data entered by operating the key, and a display section for displaying the device value set in the storage area of the storage means.

In the programmable controller according to the invention, a device value is set in the storage area of the storage means or the device value set in the storage area of the storage means is changed based on the data entered by operating the key. The device value set in the storage area of the storage means is displayed on the display section.

Therefore, the device value can be set, changed and reference easily and accurately by performing simply key operation.

In the programmable controller according to another aspect of the invention, the setting and changing means sets a device value defined in the program in the storage area of the storage means or changes the device value defined in the program based on the data entered by operating the key.

In this case, the device value defined in the program is set or changed and displayed, so that it is not feared that any other device value may be set or changed carelessly.

In the programmable controller according to another aspect of the invention, the storage means has a plurality of storage areas provided in a one-to-one correspondence with a plurality of devices, the key is used to select any of the plurality of devices, the setting and changing means sets the value of the device selected by operating the key in the corresponding storage area of the storage means or changes the device value set in the corresponding storage area of the storage means based on the data entered by operating the key, and the display section displays the value of the device selected by operating the key from among the device values set in the plurality of storage areas of the storage means.

In this case, any of the devices is selected by operating the key and the value of the selected device can be set, changed or referenced.

As the programmable controller according to yet another aspect of the invention, the invention further includes key invalidation means for invalidating operation of the key.

In this case, key operation is invalidated by the key invalidation means, whereby the device value can be prevented from being changed undesirably.

As the programmable controller according to another aspect of the invention, there further includes upper limit value setting means for setting the data entered by operating the key as an upper limit value of a device value.

In this case, the upper limit value of a device is set as desired, whereby the resolution of the setting and changing means can be adjusted as desired.

As the programmable controller according to a further aspect of the invention, the key is used to execute a predetermined instruction, and the programmable controller further includes instruction execution means for executing the predetermined instruction as the key is operated.

In this case, a predetermined instruction can be executed by operating the key without using an external unit such as a dedicated programming unit.

The entire disclosure of each and every foreign patent application from which the benefit of foreign priority has been claimed in the present application is incorporated herein by reference, as if fully set forth.

DETAILED DESCRIPTION OF THE INVENTION

Figure 1:
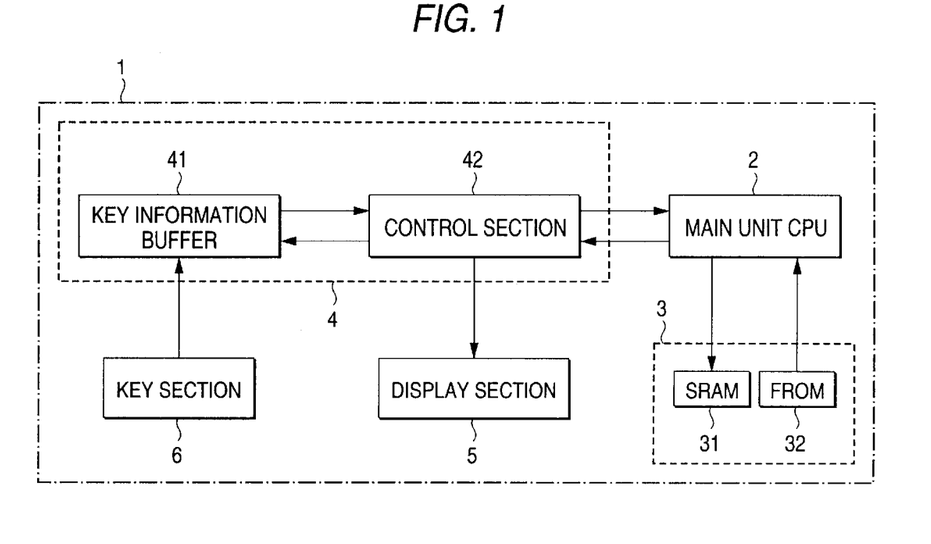
FIG. 1 is a block diagram showing the configuration of a programmable controller in one embodiment of the invention.

FIG. 1 is a block diagram showing the configuration of a programmable controller in one embodiment of the invention.

A programmable controller 1 in FIG. 1 comprises a main unit CPU (central processing unit) 2, a storage section 3, a display CPU 4, a display section 5, and a key section 6. Input machines such as a switch and a sensor (not shown) and output machines such as an electromagnetic switch, a relay, a solenoid, and a motor (not shown) are connected to the programmable controller 1.

The storage section 3 comprises SRAM (static random access memory) 31 and FROM (flash read-only memory) 32. A user program for sequentially controlling the controlled machines and various pieces of data including device information (device values) are stored in the storage section 3.

The main unit CPU 2 writes and reads data into and from the SRAM 31 and the FROM 32 in the storage section 3 and executes the user program stored in the storage section 3 to sequentially control the controlled machines.

On the other hand, the display CPU 4 comprises a key information buffer 41 and a control section 42. The display section 5 is made of a small liquid crystal display, for example, and the key section 6 consists of four keys described later. The state of the key section 6 is stored in the key information buffer 41 as key information.

When power is turned on, the control section 42 reads the display mode stored in the storage section 3 through the main unit CPU 2 and the key information stored in the key information buffer 41 and writes and reads device values into and from the storage section 3 through the main unit CPU 2. It also transfers display data to the display section 5.

The programmable controller 1 has three display modes of an analog trimmer mode, a device mode, and a system mode.

The analog trimmer mode is a mode for setting and changing internal device values defined in the user program. The device mode is a mode for referencing the value of any device and setting and changing the value of any device. The system mode is a mode for executing system instructions such as execution and stopping of the user program.

The analog trimmer mode can be executed by a general user who performs simple key operation. On the other hand, the device mode and the system mode require special key operation and generally are used by a programmer.

Figure 2:
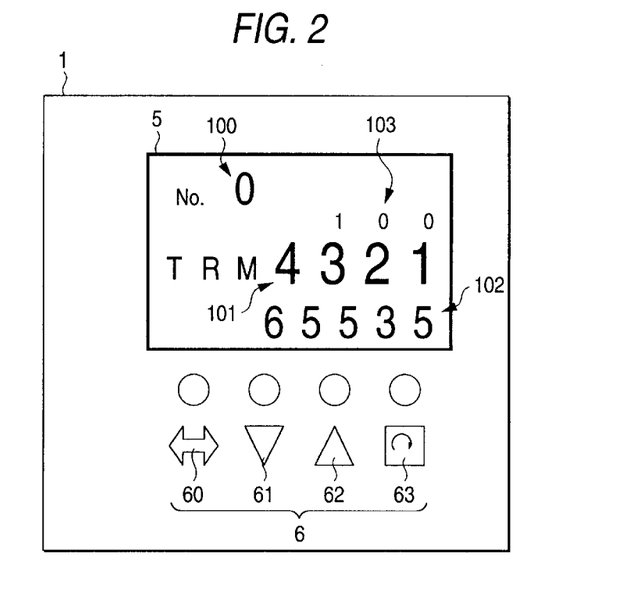
FIG. 2 is a front view showing the outward appearance of the programmable controller in FIG. 1.

FIG. 2 is a front view showing the outward appearance of the programmable controller 1 in FIG. 1.

As shown in FIG. 2, the programmable controller 1 is provided with the display section 5 and the key section 6. In the example in FIG. 2, an analog trimmer mode screen is displayed on the display section 5.

The screen displays a character string "TRM" indicating the analog trimmer mode, a trimmer number 100 of the analog trimmer, a current value 101, an upper limit value 102, and a current value increment/decrement 103. The current value increment/decrement 103 is the unit of a value added to or subtracted from the current value of the analog trimmer when the current value is changed.

The key section 6 comprises a shift key 60, a down key 61, an up key 62, and a return key 63. By operating the key section 6, the trimmer number 100 can be selected, and the current value 101, the upper limit value 102, and the current value increment/decrement 103 can be set and changed. The display mode can also be changed by operating the key section 6. The resolution of the analog trimmer can be changed by changing the upper limit value 102 of the analog trimmer.

In the example in FIG. 2, 0 is selected as the trimmer number, 65535 is set as the upper limit value, and 100 is set as the current value increment/decrement. The current value of the analog trimmer is 4321. In this case, the current value can be increased or decreased by 100 by operating the key section 6.

In the embodiment, the storage section 3 corresponds to storage means. The shift key 60, the down key 61, the up key 62, and the return key 63 in the key section 6 correspond to a key. The main unit CPU 2 and the display CPU 4 correspond to setting and changing means. The display section 5 corresponds to a display section. The shift key 60, the down key 61, and the up key 62 in the key section 6 and the display CPU 4 correspond to invalidation means. The main unit CPU 2 and the display CPU 4 correspond to instruction execution means.

Figure 3:
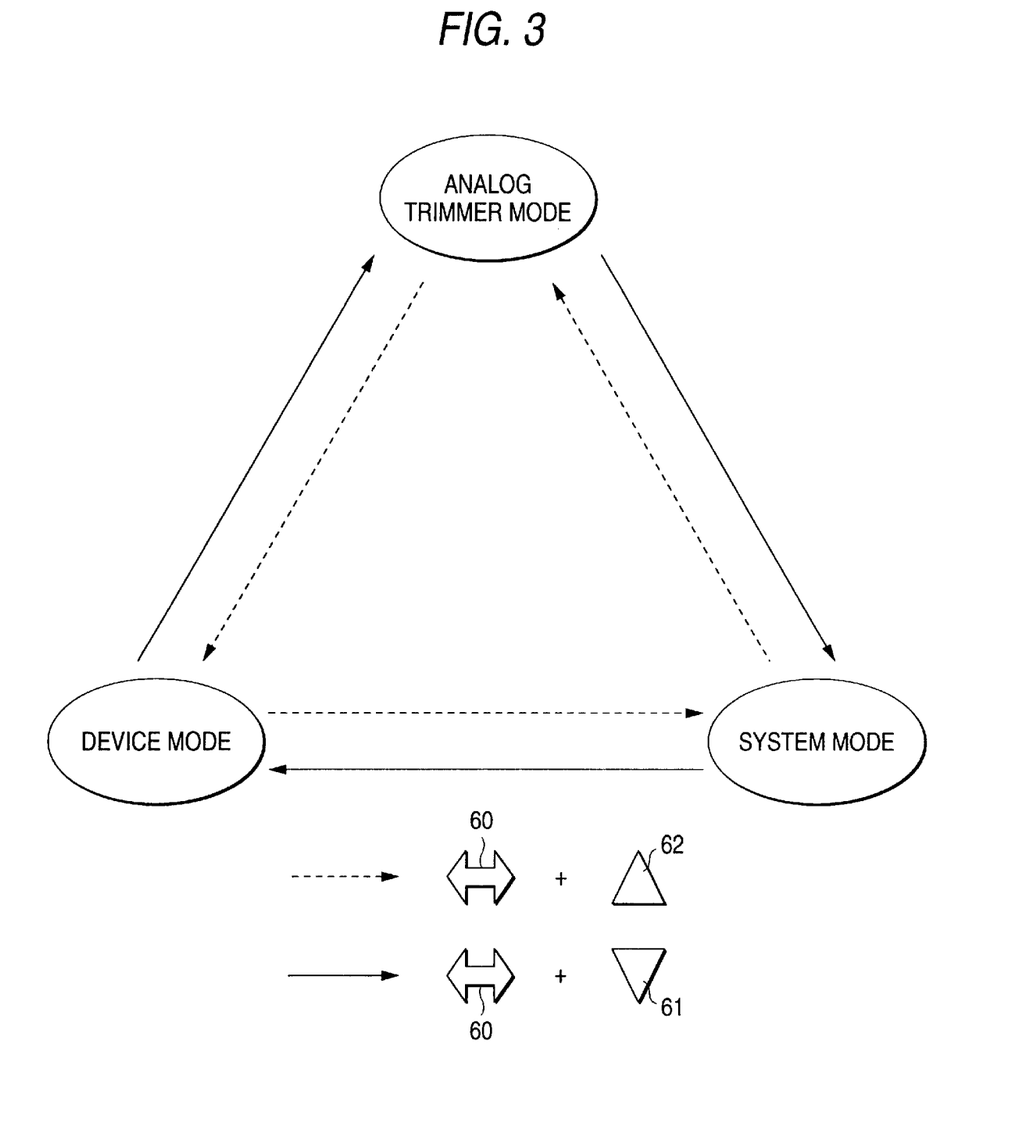
FIG. 3 is a drawing showing a display mode changing method.

FIG. 3 is a drawing showing a display mode changing method. As shown here, the up key 62 is pressed while the shift key 60 is held down, whereby the transition from the analog trimmer mode to the device mode, from the device mode to the system mode, or from the system mode to the analog trimmer mode can be made as indicated by the dashed-line arrows. The down key 61 is pressed while the shift key 60 is held down, whereby the transition from the analog trimmer mode to the system mode, from the system mode to the device mode, or from the device mode to the analog trimmer mode can be made as indicated by the solid-line arrows.

If the up key 62 remains pressed for three minutes or longer while the shift key 60 is held down, a key lock state is entered. Likewise, if the down key 61 remains pressed for three minutes or longer while the shift key 60 is held down, a key lock state is entered. Once the key lock state is entered, device values can be only referenced and cannot be set or changed.

Figure 4:
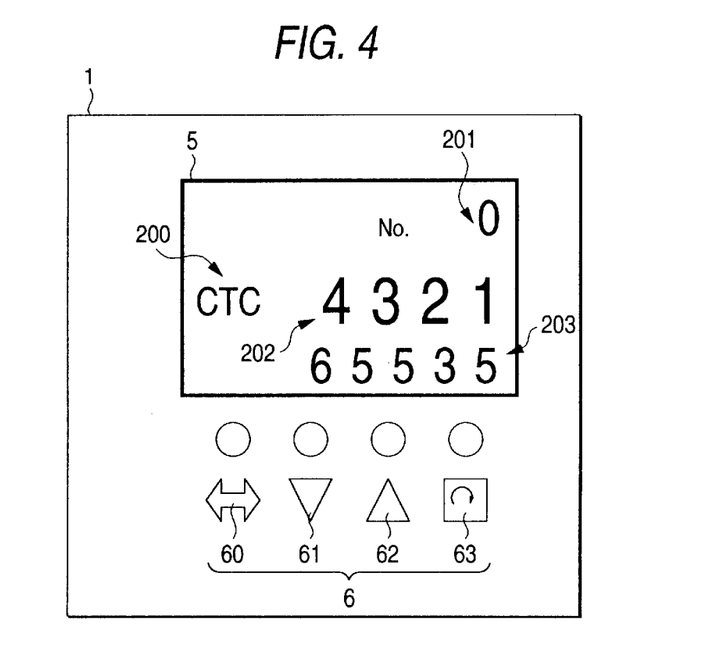
FIG. 4 is a drawing showing an example of a device mode display screen.

FIG. 4 is a drawing showing an example of a device mode display screen. As shown here, a device type 200, a device number 201, a current value 202, and a setup value 203 are displayed in the device mode.

In this case, the device type 200 and the device number 201 can be selected and the setup value 203 can be changed by operating the key section 6. The display mode can also be changed by operating the key section 6.

In the example in FIG. 4, a high-speed counter comparator "CTC" t is selected as the device type and 0 as the device number. The high-speed counter comparator compares a setup value with the current value of the high-speed counter comparator using hardware. When they match, the high-speed counter comparator sets contacts. The current value of the high-speed counter comparator is 4321 and the setup value is 65535.

Figure 5:
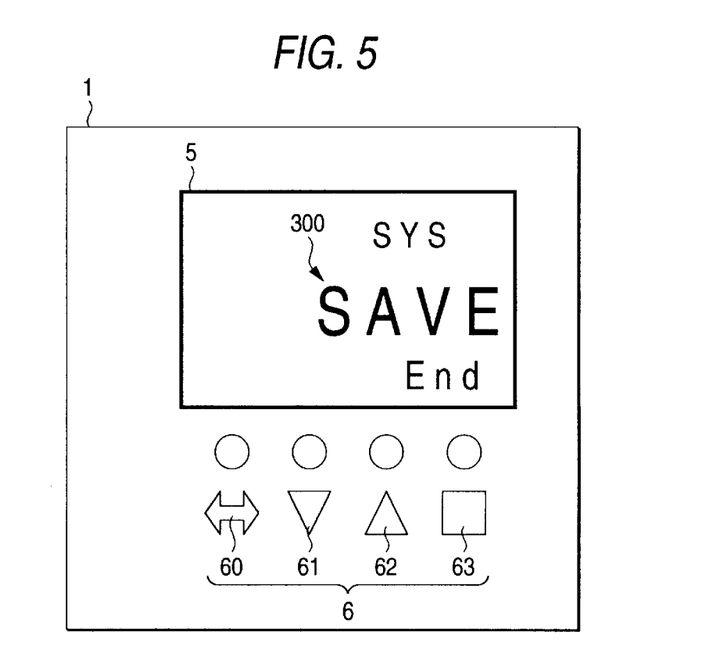
FIG. 5 is a drawing showing an example of a system mode display screen.

FIG. 5 is a drawing showing an example of a system mode display screen. As shown here, the screen displays a character string "SYS" indicating the system mode and an instruction type 300.

"SAVE" or "LOAD" is selected as the instruction type 300. The SAVE is a transfer (write) instruction of data from the SRAM 31 in the storage section 3 in FIG. 1 to (into) the FROM 32, and the LOAD is a data transfer (read) instruction from the FROM 32 to the SRAM 31.

Data is usually stored in the SRAM 31. When power is turned off, the data is backed up with a battery. However, because of the life of the battery, the data cannot be retained if the power off state continues for a long time. Thus, the data in the SRAM 31 can be transferred to the FROM 32 by executing the SAVE in the system mode for saving the data. The data retained in the FROM 32 can be transferred to the SRAM 31 for use by executing the LOAD in the system mode. After the termination of the data transfer, a character string "End" indicating transfer termination is displayed on the screen for three seconds.

In the system mode, an instruction for executing the user program, RUN, and an instruction for stopping execution of the user program and enabling programming, PROG, can also be given. In the system mode, the instruction type 300 can be changed by operating the key section 6. The display mode can also be changed by operating the key section 6.

The operation state of the main unit CPU 2 is indicated with a backlight of the display section 5. While the instruction RUN is being executed, the backlight becomes green. While the instruction PROG is being executed, the backlight becomes red. When an error occurs, the backlight blinks in red and an error code is displayed.

Figure 6:
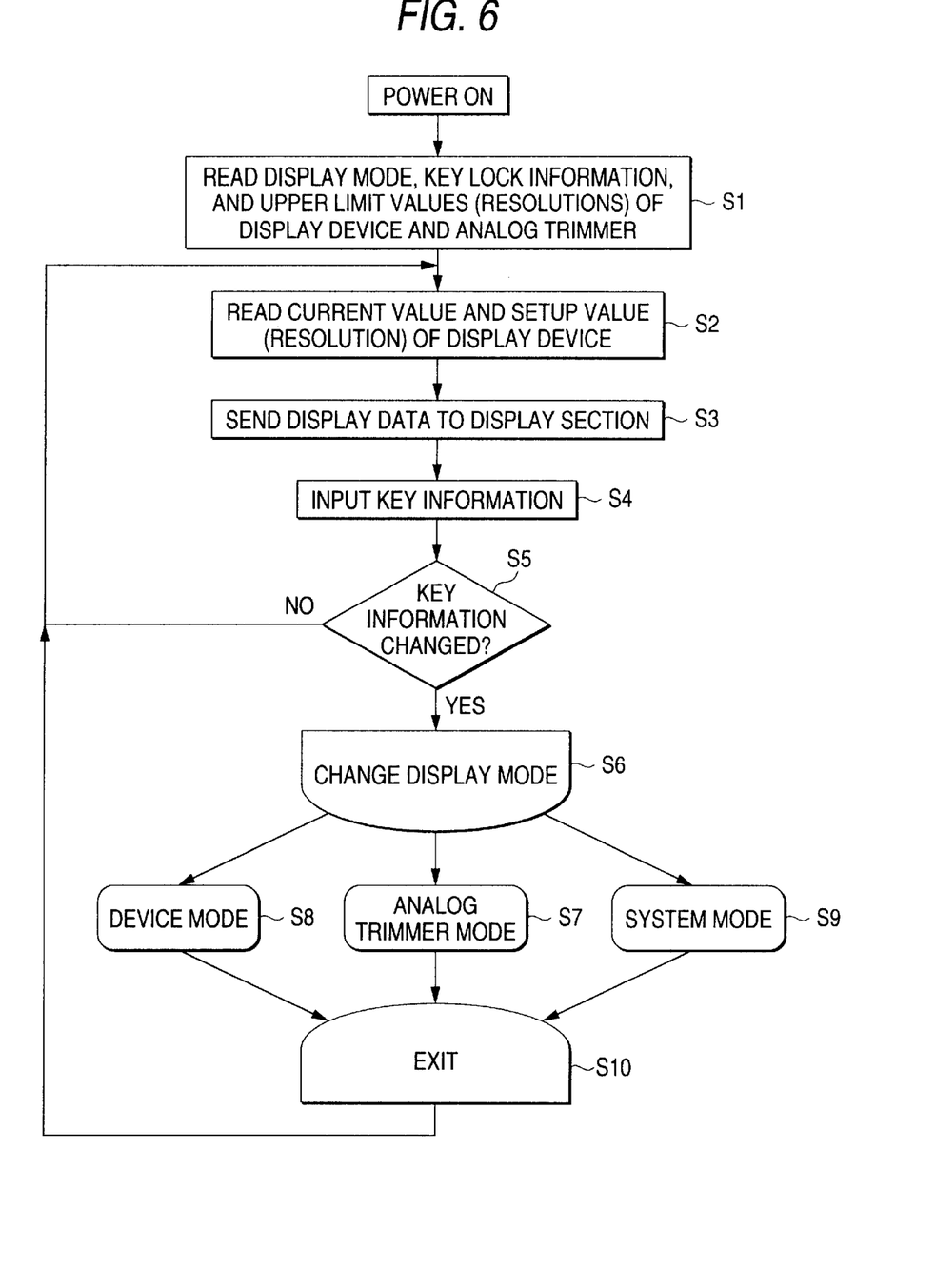
FIG. 6 is a flowchart showing a main routine of the operation of a control section of a display CPU of the programmable controller in FIG. 1.
Figure 7:
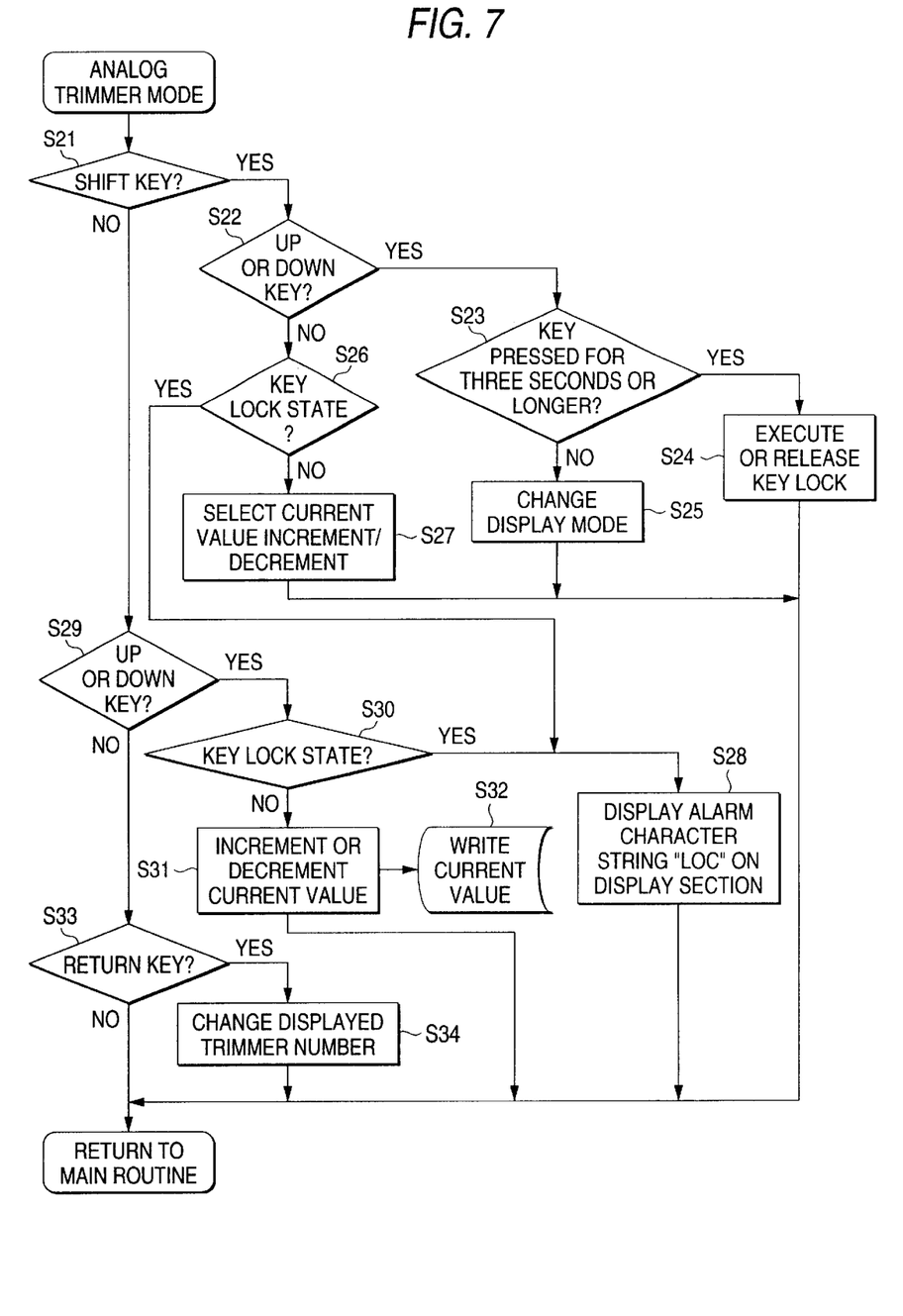
FIG. 7 is a flowchart showing a subroutine of an analog trimmer mode.
Figure 8:
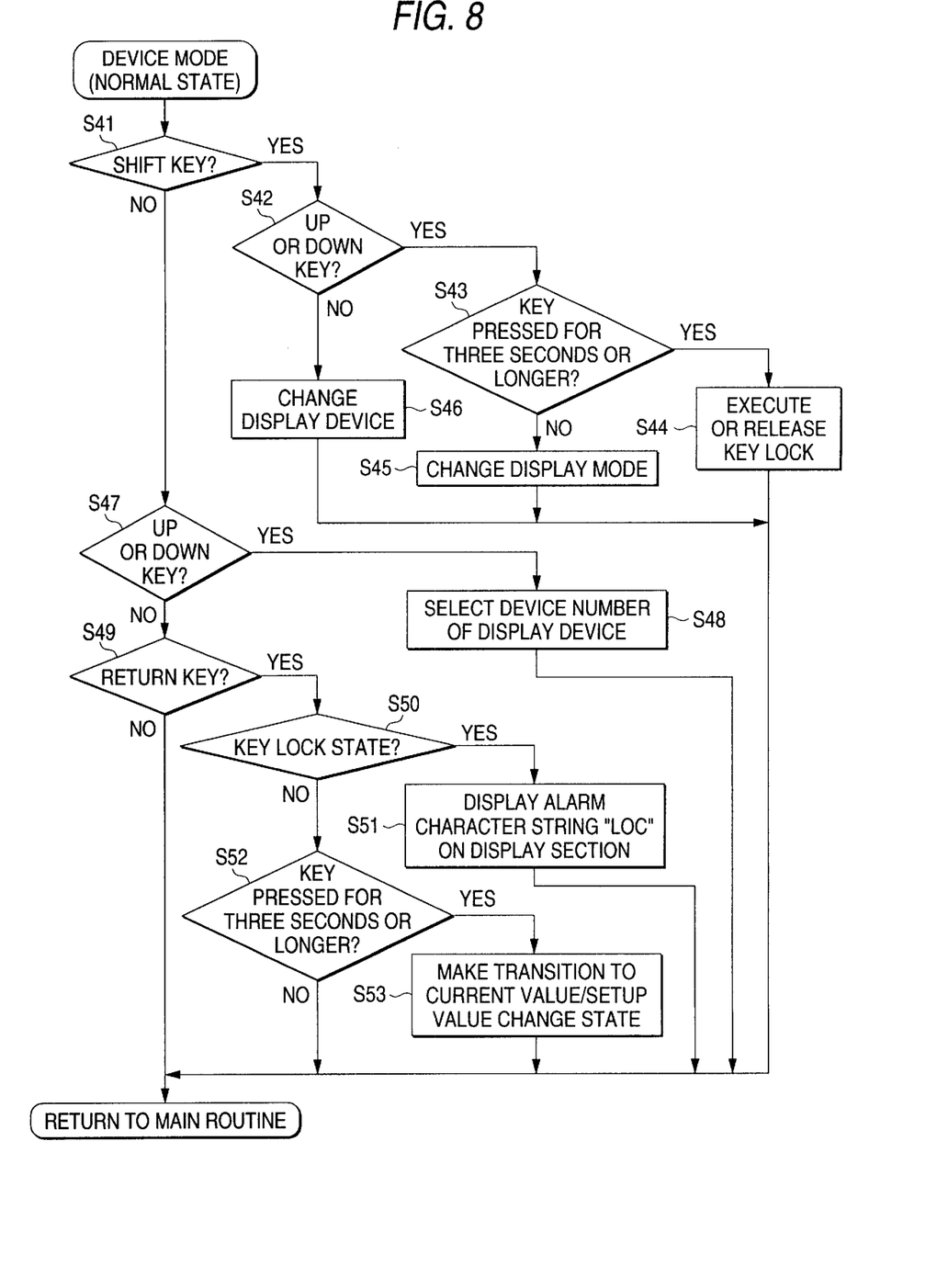
FIG. 8 is a flowchart showing a subroutine of the normal state of a device mode.
Figure 9:
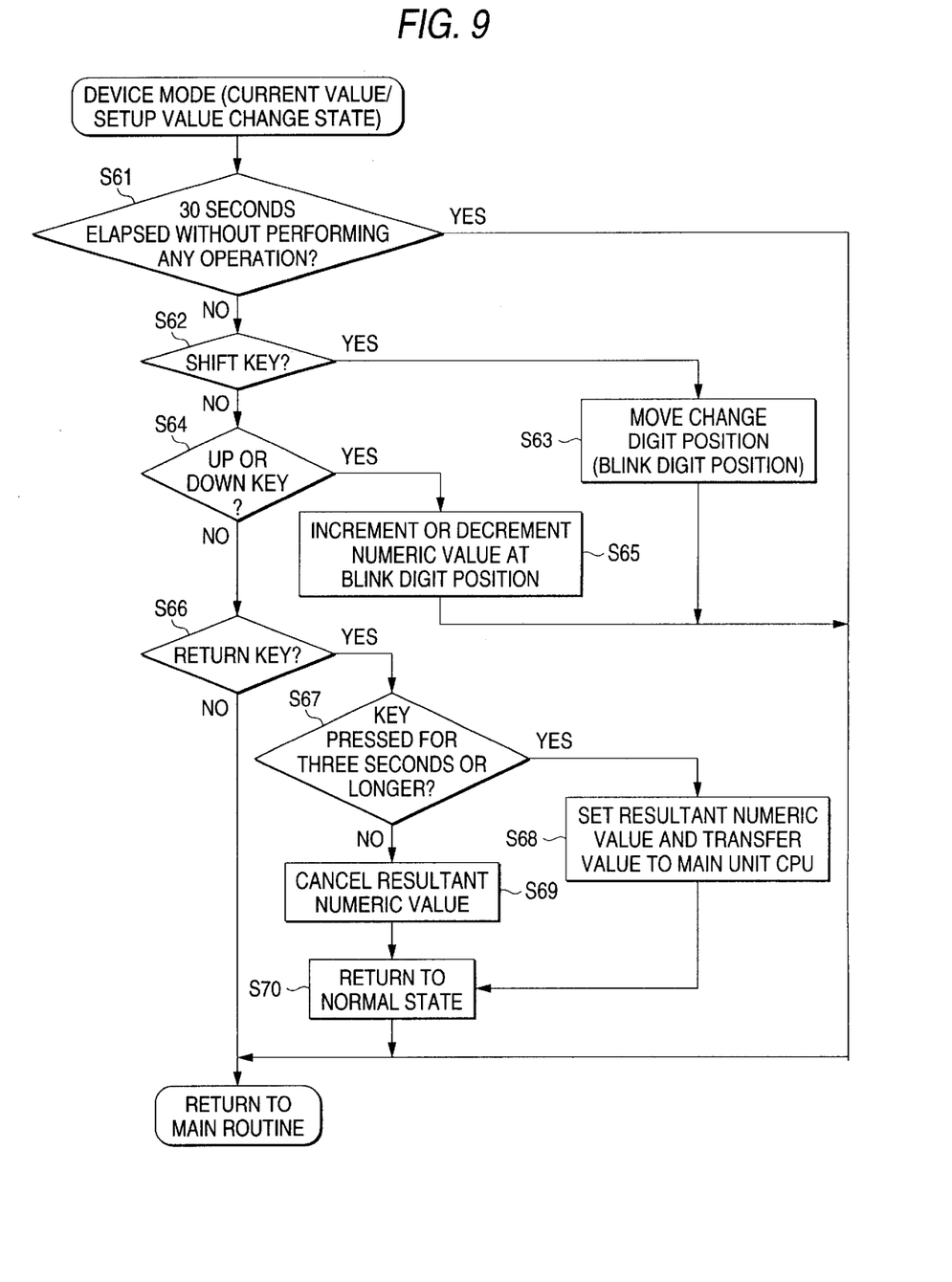
FIG. 9 is a flowchart showing a subroutine of the current value/setup value change state of the device mode.
Figure 10:
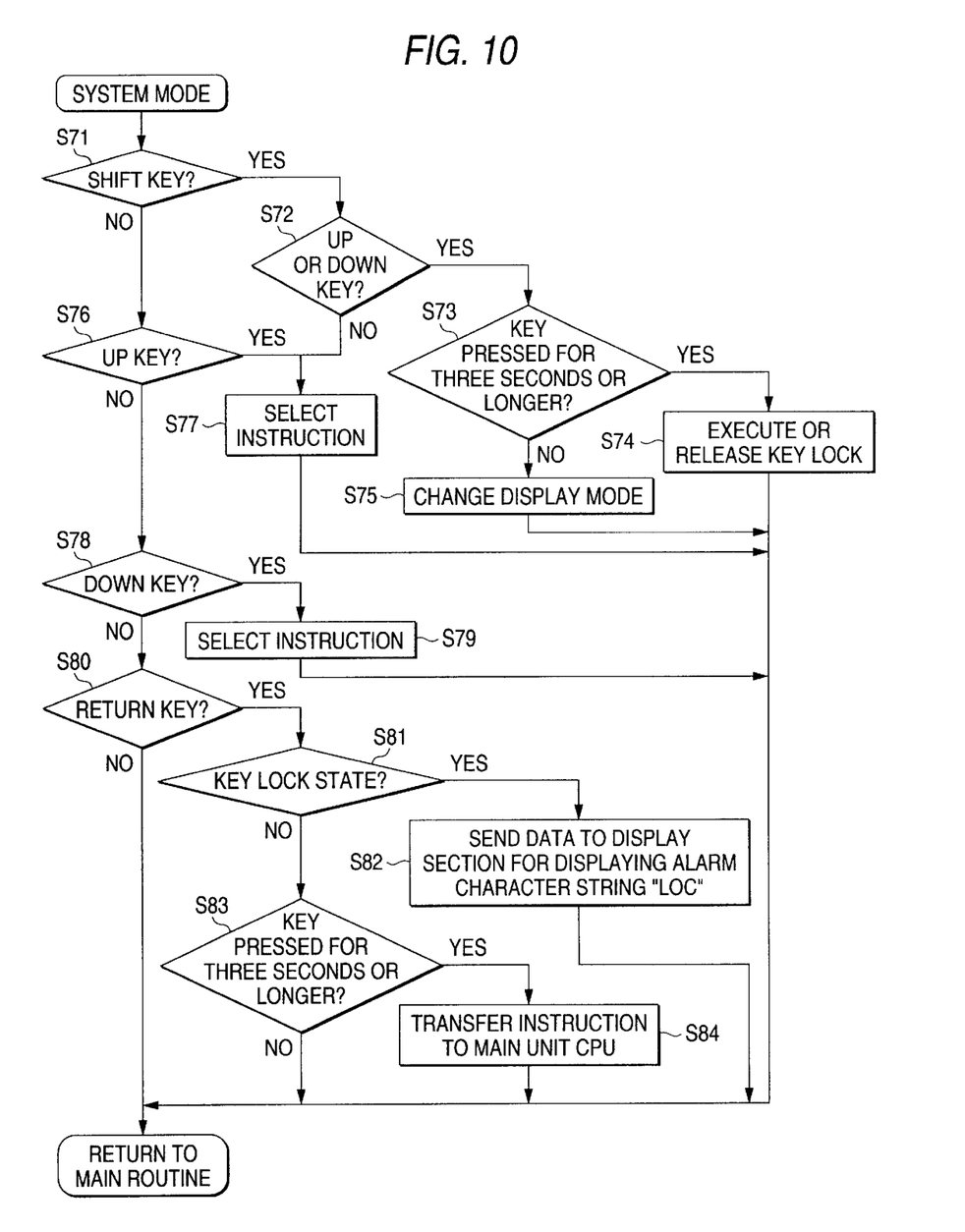
FIG. 10 is a flowchart to showing a subroutine of a system mode.

FIGS. 6 to 10 are flowcharts of the operation of the control section 42 of the display CPU 4 of the programmable controller 1 in FIG. 1. FIG. 6 shows a main routine indicating the general operation. FIG. 7 shows a subroutine indicating the analog trimmer mode. FIG. 8 shows a subroutine indicating the normal state of the device mode. FIG. 9 shows a subroutine indicating the current value/setup value change state of the device mode. FIG. 10 shows a subroutine indicating the system mode. The operation of the control section 42 will be discussed with reference to FIGS. 6 to 10.

The storage section 3 in FIG. 1 stores the display mode set when power is off, the key lock information indicating the key lock state, and the upper limit values of the display device (i.e., device to be displayed) and the analog trimmer.

First, when power is turned on, the control section 42 reads the display mode, the key lock information, and the upper limit values (resolutions) of the display device and the analog trimmer stored in the storage section 3, through the main unit CPU 2 at step S1 in FIG. 6.

Next, the control section 42 reads the current value and the setup value (or resolution) of the display device from the storage section 3 through the main unit CPU 2 at step S2. It sends display data to the display section 5 at step S3 and inputs key information from the key information buffer 41 at step S4. If the key information input from the key information buffer 41 does not change at step S5, the control section 42 returns to step S2.

If the key information input from the key information buffer 41 changes at step S5, the control section 42 changes the display mode at step S6, whereby it makes the transition to the analog trimmer mode at step S7, the device mode at step S8, or the system mode at step S9 (described later). After the control section 42 exits from the device, analog trimmer, or system mode at step S10, it returns to step S2.

Next, in the analog trimmer mode in FIG. 7, first the control section 42 determines whether or not the shift key 60 is pressed at step S21. If the shift key 60 is pressed, the control section 42 determines whether or not the up key 62 or the down key 61 is pressed at step S22. If the up key 62 or the down key 61 is pressed, the control section 42 determines whether or not the key is pressed for three seconds or longer at step S23. If the key is pressed for three seconds or longer, the control section 42 executes or releases key lock at step S24 and returns to the main routine.

If neither the up key 62 nor the down key 61 is pressed for three seconds or longer at step S23, the control section 42 changes the display mode at step S25. If the up key 62 is pressed, the control section 42 makes the transition to the normal state of the device mode; if the down key 61 is pressed, the control section 42 makes the transition to the system mode and returns to the main routine.

If neither the up key 62 nor the down key 61 is pressed at step S22, the control section 42 determines whether or not the key lock state is entered at step S26. If the key lock state is not entered, the control section 42 selects current value increment/decrement at step S27 and returns to the main routine. If the key lock state is entered, the control section 42 sends data to the display section 5 for displaying an alarm character string "LOC" at step S28 and returns to the main routine.

If the shift key 60 is not pressed at step S21, the control section 42 determines whether or not the up key 62 or the down key 61 is pressed at step S29. If the up key 62 or the down key 61 is pressed, the control section 42 determines whether or not the key lock state is entered at step S30. If the key lock state is entered, the control section 42 sends data to the display section 5 for displaying an alarm character string "LOC" at step S28 and returns to the main routine.

If the key lock state is not entered, the control section 42 increments or decrements the current value at step S31 and writes the current value into the storage section 3 through the main unit CPU 2 at step S32, then returns to the main routine.

If neither the up key 62 nor the down key 61 is pressed at step S29, the control section 42 determines whether or not the return key 63 is pressed at step S33. If the return key 63 is pressed, the control section 42 changes the displayed trimmer number at step S34 and returns to the main routine. If the return key 63 is not pressed, the control section 42 returns to the main routine.

Thus, key lock can be executed or released and the display mode can be changed by operating the shift key 60 and the up key 62 or the down key 61; current value increment/decrement can be selected by operating the shift key 60; the current value can be changed by operating the up key 62 or the down key 61; and the trimmer number can be changed by operating the return key 63.

In the normal state of the device mode in FIG. 8, first the control section 42 determines whether or not the shift key 60 is pressed at step S41. If the shift key 60 is pressed, the control section 42 determines whether or not the up key 62 or the down key 61 is pressed at step S42. If the up key 62 or the down key 61 is pressed, the control section 42 determines whether or not the key is pressed for three seconds or longer at step S43. If the key is pressed for three seconds or longer, the control section 42 executes or releases key lock at step S44 and returns to the main routine.

If neither the up key 62 nor the down key 61 is pressed for three seconds or longer at step S43, the control section 42 changes the display mode at step S45. If the up key 62 is pressed, the control section 42 makes the transition to the system mode; if the down key 61 is pressed, the control section 42 makes the transition to the analog trimmer mode and returns to the main routine.

If neither the up key 62 nor the down key 61 is pressed at step S42, the control section 42 changes the display device at step S46 and returns to the main routine. The display device type is data memory, temporary memory, timer/counter, high-speed counter comparator, or internal relay (auxiliary relay).

If the shift key 60 is not pressed at step S41, the control section 42 determines whether or not the up key 62 or the down key 61 is pressed at step S47. If the up key 62 or the down key 61 is pressed, the control section 42 selects the device number of the display device at step S48 and returns to the main routine.

If neither the up key 62 nor the down key 61 is pressed at step S47, the control section 42 determines whether or not the return key 63 is pressed at step S49. If the return key 63 is pressed, the control section 42 determines whether or not the key lock state is entered at step S50. If the key lock state is entered, the control section 42 sends data to the display section 5 for displaying an alarm character string "LOC" at step S51 and returns to the main routine.

If the key lock state is not entered, the control section 42 determines whether or not the return key 63 is pressed for three seconds or longer at step S52. If the return key 63 is pressed for three seconds or longer, the control section 42 makes the transition to the current value/setup value change state in FIG. 9 at step S53, then returns to the main routine. If the return key 63 is not pressed for three seconds or longer, the control section 42 returns to the main routine.

If the return key 63 is not pressed at step S49, the control section 42 returns to the main routine.

In the current value/setup value change state of the device mode in FIG. 9, the control section 42 determines whether or not 30 seconds have elapsed without performing any operation at step S61. If 30 seconds have elapsed without performing any operation, the control section 42 returns to the main routine. If 30 seconds have not elapsed without performing any operation, the control section 42 determines whether or not the shift key 60 is pressed at step S62. If the shift key 60 is pressed, the control section 42 moves the blinking change digit position (blink digit position) at step S63 and returns to the main routine.

If the shift key 60 is not pressed at step S62, the control section 42 determines whether or not the up key 62 or the down key 61 is pressed at step S64. If the up key 62 or the down key 61 is pressed, the control section 42 increments or decrements the numeric value at the blink digit position at step S65 and returns to the main routine.

If neither the up key 62 nor the down key 61 is pressed at step S64, the control section 42 determines whether or not the return key 63 is pressed at step S66. If the return key 63 is pressed, the control section 42 determines whether or not the key is pressed for three minutes or longer at step S67. If the key is pressed for three minutes or longer, the control section 42 sets the resultant numeric value and transfers the value to the storage section 3 through the main unit CPU 2 at step S68, and returns to the normal state of the device mode in FIG. 8 at step S70. If the return key 63 is not pressed for three minutes or longer, the control section 42 cancels the resultant numeric value at step S69 and returns to the normal state of the device mode in FIG. 8 at step S70.

If the return key 63 is not pressed at step S66, the control section 42 returns to the main routine.

Thus, in the device mode, key lock is executed or released and the display mode is changed by operating the shift key 60 and the up key 62 or the down key 61, the display device is changed by operating the shift key 60, the device number of the display device is selected by operating the up key 62 or the down key 61, and the current value or the setup value can be changed by operating the return key 63, the shift key 60, and the up key 62 or the down key 61.

In the system mode in FIG. 10, first the control section 42 determines whether or not the shift key 60 is pressed at step S71. If the shift key 60 is pressed, the control section 42 determines whether or not the up key 62 or the down key 61 is pressed at step S72. If the up key 62 or the down key 61 is pressed, the control section 42 determines whether or not the key is pressed for three seconds or longer at step S73. If the key is pressed for three seconds or longer, the control section 42 executes or releases key lock at step S74 and returns to the main routine.

If neither the up key 62 nor the down key 61 is pressed for three seconds or longer at step S73, the control section 42 changes the display mode at step S75. If the up key 62 is pressed, the control section 42 makes the transition to the analog trimmer mode; if the down key 61 is pressed, the control section 42 makes the transition to the device mode and returns to the main routine.

If neither the up key 62 nor the down key 61 is pressed at step S72, the control section 42 selects an instruction at step S77 and returns to the main routine. In this case, each time the shift key 60 is pressed, the instruction is changed to PROG to RUN to LOAD to SAVE to PROG.

If the shift key 60 is not pressed at step S71, the control section 42 determines whether or not the up key 62 is pressed at step S76. If the up key 62 is pressed, the control section 42 selects an instruction at step S77 and returns to the main routine. In this case, each time the up key 62 is pressed, the instruction is changed to PROG to RUN to LOAD to SAVE to PROG.

If the up key 62 is not pressed at step S76, the control section 42 determines whether or not the down key 61 is pressed at step S78. If the down key 61 is pressed, the control section 42 selects an instruction at step S79 and returns to the main routine. In this case, each time the down key 61 is pressed, the instruction is changed to SAVE to LOAD to RUN to PROG to SAVE.

If the down key 61 is not pressed at step S78, the control section 42 determines whether or not the return key 63 is pressed at step S80. If the return key 63 is pressed, the control section 42 determines whether or not the key lock state is entered at step S81. If the key lock state is entered, the control section 42 sends data to the display section 5 for displaying an alarm character string "LOC" at step S82 and returns to the main routine.

If the key lock state is not entered at step S81, the control section 42 determines whether or not the return key 63 is pressed for three seconds or longer at step S83. If the key is pressed for three seconds or longer, the control section 42 transfers the selected instruction to the storage section 3 through the main unit CPU 2 at step S84 and returns to the main routine. If the key is not pressed for three seconds or longer, the control section 42 returns to the main routine.

If the return key 63 is not pressed at step S80, the control section 42 returns to the main routine.

Thus, in the system mode, key lock is executed or released and the display mode is changed by operating the shift key 60 and the up key 62 or the down key 61, an instruction is selected by operating the shift key 60, the up key 62, or the down key 61, and execution of the instruction can be specified by operating the return key 63.

Thus, with the programmable controller 1 of the embodiment, in the analog trimmer mode, the device value defined in a program can be set or changed easily and accurately by performing a simple key operation. Moreover, the setup value can be checked easily on the screen.

In this case, the setup value of the analog trimmer is not changed due to shock or carelessness. A tool such as a screwdriver need not be used for changing the setup value of the analog trimmer either. The resolution of the analog trimmer can be adjusted as desired by changing the upper limit value of the analog trimmer.

In the device mode, the value of any desired device can be referenced without connecting an external unit such as a programming unit, and can also be set and changed.

Further, in the system mode, instructions for executing and stopping the user program, writing data into the FROM 32, and reading data from the FROM 32 can be given without connecting an external unit such as a programming unit.

The programmable controller 1 of the embodiment can operate at a high speed because the display CPU 4 is provided in addition to the main unit CPU 2.

While only certain embodiments of the invention have been specifically described herein, it will be apparent that numerous modifications may be made thereto without departing from the spirit and scope of the invention.

What is claimed is:

1. A programmable controller for sequentially controlling a controlled machine in accordance with a program, said programmable controller comprising:

storage means having a storage area defined as a device;

a key section for entering data into said storage means;

setting and changing means for setting a device value in the storage area of said storage means or changing the device value set in the storage area based on the data entered by operating said key section;

a display section for displaying the device value set in the storage area of said storage means; and key locking means for locking said key section so that the device value is prevented from being changed undesirably.

2. The programmable controller as claimed in claim 1, wherein said key locking means includes said key section and said display section.

3. The programmable controller as claimed in claim 1, wherein said key section includes at least two keys, and said key locking means is operable to provide key lock states and release of the key lock states.

4. The programmable controller as claimed in claim 3, wherein said key locking means provides a first key lock state activated and released by simultaneously pushing two of the at least two keys for a predetermined time.

5. The programmable controller as claimed in claim 4, wherein said display section displays the first key lock state while it is activated.

6. The programmable controller as claimed in claim 1, wherein said key locking means provides a second key lock state which is operable to prevent setting or changing of the device value.

7. The programmable controller as claimed in claim 6, wherein said key locking means provides the second key lock state to only refer to the device value.

8. The programmable controller as claimed in claim 6, wherein said display section includes a first display mode displaying the device value set in the storage area and a second display mode displaying at least one of a running or stopped status of a user program, and said display section includes switching means for switching between the first display mode and the second display mode, the switching means independent of the second key lock state.

9. The programmable controller as claimed in claim 1, wherein said display section includes a first display mode displaying the device value set in the storage area and a second display mode displaying at least one of a running or stopped status of a user program, and said display section includes switching means for switching between the first display mode and the second display mode.

10. A programmable controller for sequentially controlling a controlled machine in accordance with a program, said programmable controller comprising:

storage means having a storage area defined as a device;

a key for entering data and invalidating operation of said key so that said key is in a lock state;

setting and changing means for setting a device value in the storage area of said storage means or changing the device value set in the storage area based on the data entered by operating said key; and a display section for displaying the device value set in the storage area of said storage means, wherein said display section includes a first display mode displaying the device value set in the storage area and a second display mode displaying at least one of a running or stopped status of a user program, and said display section includes switching means for switching between the first display mode and the second display mode.

11. The programmable controller as claimed in claim 10, wherein said setting and changing means sets a device value defined in the program or changes the device value defined in the program based on the data entered by operating said key.

12. The programmable controller as claimed in claim 10, wherein said storage means has a plurality of storage areas provided in a one-to-one correspondence with a plurality of devices;

said key is used to select any of the plurality of devices;

said setting and changing means sets a value of the device selected by operating said key in the corresponding storage area of said storage means or changes the device value set in the corresponding storage area of said storage means based on the data entered by operating said key; and said display section displays the value of the device selected by operating said key from among the device values set in the plurality of storage areas of said storage means.

13. The programmable controller as claimed in claim 10, further comprising upper limit value setting means for setting the data entered by operating said key as an upper limit value of a device value.

14. The programmable controller as claimed in claim 10, wherein said key is used to execute a predetermined instruction, and further comprising instruction execution means for executing the predetermined instruction as said key is operated.

* * * * *